United States Patent [19]
Tsuchiya et al.

[11] Patent Number: 4,855,727
[45] Date of Patent: Aug. 8, 1989

[54] ELECTROCHROMIC DISPLAY HAVING A DIELECTRIC LAYER

[75] Inventors: Soji Tsuchiya, Tsukui; Yoshimasa Ito, Tokyo; Sadashi Higuchi, Kawasaki; Akio Yamashita, Tsukui, all of Japan

[73] Assignee: Matsushita Electric Industrial Company, Ltd., Kadoma, Japan

[21] Appl. No.: 874,829

[22] Filed: Jun. 16, 1986

Related U.S. Application Data

[63] Continuation of Ser. No. 505,173, Jun. 17, 1983, abandoned.

[30] Foreign Application Priority Data

Jun. 18, 1982 [JP] Japan ................... 57-105904

[51] Int. Cl.$^4$ ............................................. G09G 3/34
[52] U.S. Cl. ................................. 340/785; 350/357
[58] Field of Search ................. 340/785; 350/357, 363

[56] References Cited

U.S. PATENT DOCUMENTS 3,836,229 9/1974 Saurer ........................... 340/785

FOREIGN PATENT DOCUMENTS 2815307 10/1978 Fed. Rep. of Germany ...... 340/785

Primary Examiner—Marshall M. Curtis
Attorney, Agent, or Firm—Cushman, Darby & Cushman

[57] ABSTRACT

An electrochromic display device comprises a pair of first and second, opposed insulative substrates, a layer of electrochromic substance sandwiched between the substrates, a transparent display electrode on the first substrate, and a counter electrode on the second substrate. A dielectric layer analogous in pattern to the display electrode is formed on the counter electrode to improve the device's life time and eliminate interference between adjacent display electrodes.

7 Claims, 2 Drawing Sheets

ELECTROCHROMIC DISPLAY HAVING A DIELECTRIC LAYER

This is a continuation of application Ser. No. 505,173 filed June 17, 1983, which was abandoned upon the filing hereof.

BACKGROUND OF THE INVENTION

The present invention relates to an electrochromic display device.

In conventional electrochromic display elements a layer of electrochromic substance, either liquid or solid, is sandwiched between a pair of opposed glass members. On one of the glass plates is provided a counter electrode and on the other electrode is one or more individual electrodes having a particular display pattern. These electrodes are formed of a transparent conductive material such as $In_2O_3$ and $SnO_2$. Various shortcomings exist in conventional electrochromic display devices that affect their life time and quality.

When a potential is applied to a given display electrode, light from a chemical reaction occurs in the electrochromic material adjacent thereto for developing a given color or bleaching it, depending on the polarity of the applied voltage. Oxidation or reduction is correspondingly triggered in areas adjacent to the counter plate electrode. To assure stability in such reversible reaction the couuter plate electrode is formed of a metal oxide, such as iron oxides. However, after $10^4$ to $10^6$ times of device operation, it has been found that device tends to manifest a drift in field potential in areas adjacent to the counter plate electrode. This in turn prevents the necessary field potential from being developed in areas adjacent to pattern electrodes. The life time is also considered to be affected by a current which arises from a side effect of the reversible actions of the electrochromic substance. It is desirable that no current flow when the device attains a certain level of intensity.

Color shading is a predominant factor that determines the quality of a multi-segment electrochromic display device. If use is made of a solid electrochromic substance such as $WO_3$, variations in layer thickness and evaporation condition from one layer to another tend to produce a wide range of different shades of color. Furthermore, the image retaining power of a given element tends to be affected by the formation of a color in an adjacent display element. To avoid this, a complicated circuit was needed.

SUMMARY OF THE INVENTION

According to the invention, the electrochromic display device comprises a pair of first and second, opposed insulative substrates, a layer of electrochromic substance sandwiched between the substrates, a transparent display electrode on the first substrate, and a counter electrode on the second substrate, the counter electrode comprising a dielectric region in opposed relationship with the display electrode and a conductive region surrounding the dielectric region.

By the provision of the dielectric region, the device performance is significantly improved in terms of life time, field potential drift and color retaining power, and interference.

BRIEF DESCRIPTION OF THE DRAWINGS

The present invention will be described in further detail with reference to the accompanying drawings, in which.

DETAILED DESCRIPTION

Figure 1:
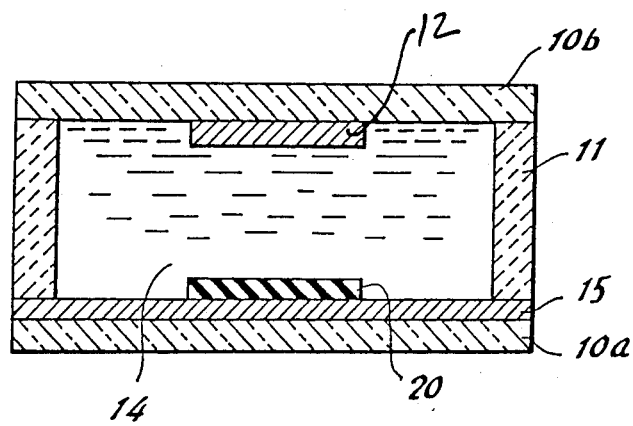
FIG. 1 is a cross-sectional view of an embodiment of the invention.

Referring now to FIG. 1, there is shown an electrochromic display device according to the present invention. The electrochromic display device comprises a pair of glass substrates 10a and 10b. A transparent conductive lyaer 15 is deposited on the entire surface of the substrate 10a to serve as a counter plate electrode. A display electrode 12 of a transparent conductive material is provided on the substrate 10b in opposite relationship with the counter plate electrode 15. The substrates 10a and 10b are secured together by a frame member 11 to contain a known electrochromic substance 14.

Figure 3:
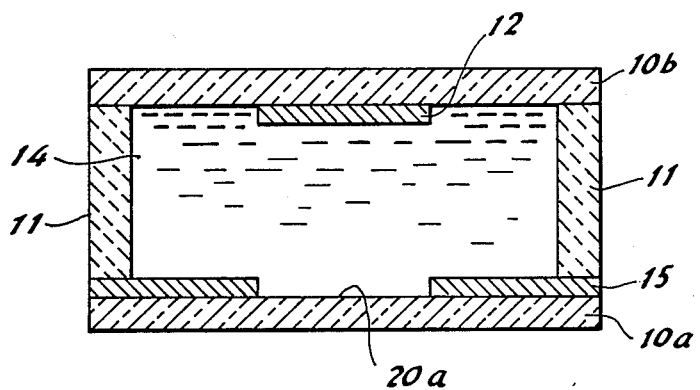
FIGS. 3 and 4 are illustrations of alternative embodiments.
Figure 4:
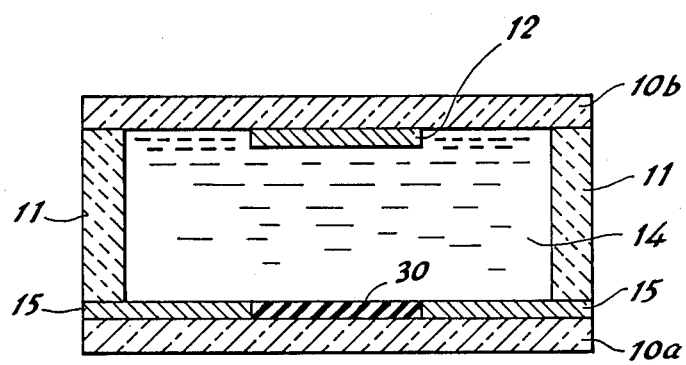

On the counter electrode 15 is deposited a layer 20 of a dielectric material. A suitable material for the dielectric layer 20 includes glass, metal oxides ($SiO_2$, $SiO$, $Al_2O_3$, $BaTiO_3$), metal fluorides $CaF_2$, $MgF_2$) and metal nitrides ($Si_3N_4$). The dielectric layer 20 an analogous pattern to that of display electrode 12. Alternatively, the dielectric layer is formed by etching a portion of the counter electrode 15, as shown at 20a in FIG. 3, to expose the underlying glass member 10a to the electrochromic layer 14. A dielectric layer 30 may be deposited in the exposed area as shown in FIG. 4.

The dielectric layer 20 may be made larger than the display electrode 12 to the extent that the edge effect that causes images to be blurred is tolerable. The visual impression given by the image depends on the relative size of the dielectric layer 20 to the display electrode 12. The oversized dielectric layer produces a softening effect, while the undersized dielectric layer produces sharply defined images.

The dielectric layer 20 further minimizes the effect of undersirable interference between adjacent display electrodes, so that the formation of a color at one display electrode has no effect on the amount of time during which the image stored in an adjacent electrode can be retained.

For purposes of evaluating the operating performance of the invention, a number of electrochromic display devices were constructed.

EXAMPLE I

The device comprised a display electrode 12 of a rectangular shape measuring 4 mm×5 mm and a counter plate electrode 15 measuring 10 mm×20 mm. The electrodes comprise $In_2O_3$ and spaced about 40 micrometers apart. The electrochromic layer 14 comprises a coloring agent composed of 3,3-dimethyl-2-(p-dimethylaminostyrl)indolino-[2.1-b]oxazoline and a supporting electrolyte composed of tetrabutyl ammonium perchlorate. Acetonitrile was used as a solution. The densities of the colorant and supporting electrolyte were 0.02 mol/liter and 0.1 mol/liter, respectively. The dielectric layer 20 was formed on the counter plate electrode 15 by vacuum depositing $SiO_2$ to a thickness of 1000 Angstrom units. Three samples were constructed using different sizes of dielectric layers respectively measuring 4.5 mm×5.6 mm, 4 mm×5 mm and 3.5 mm×4.4 mm.

Figure 2:
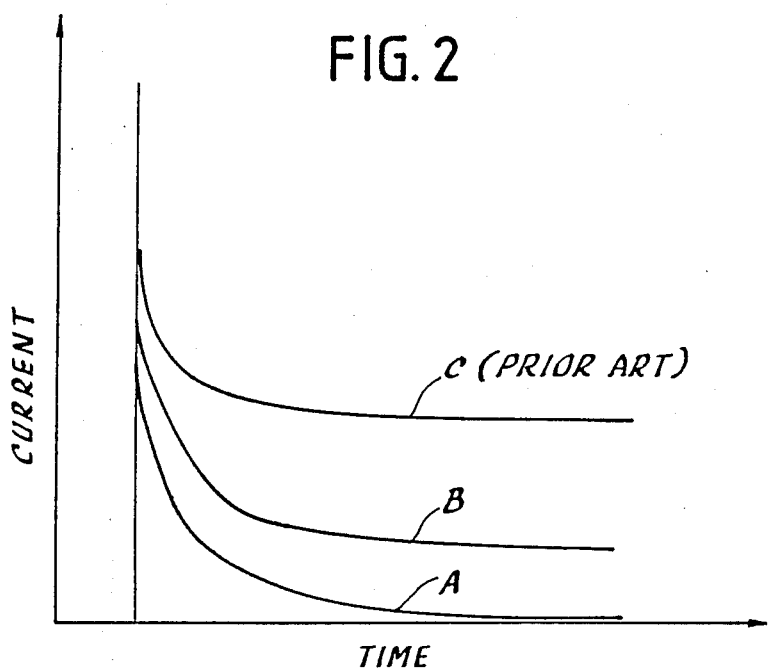
FIG. 2 is a graphic illustration of current drift characteristics of electrochromic display devices the invention in comparison with a prior art device.

The display electrode 12 was positively biased with respect to the counter plate electrode 15 by a d.c. potential of 1.3 volts. The display electrode 12 exhibited a pink-colored light having an absorption peak near 550 nanometers. Furthermore, no color shading was observed regardless of the relative positions of adjacent display electrodes and the brightness remained at a constant level. It was observed that with the devices of which the dielectric layers are equal to or greater in size than the display electrode exhibited a light pattern equal in size to the display electrode. However, with undersized dielectric layer the deivce retained the same size of light pattern as that of the display electrode for a period of a few seconds immediately after the applications of the d.c. potential. After this initial period, the light pattern shrinked to the size of the undersized dielectric layer. It was further observed that the device having the oversized dielectric layer exhibited a current drift that decays as a function of time and approaches a near zero value as indicated by a curve A in FIG. 2. Whereas, the device having the undersized dielectric layer exhibited a current drift settling at a relatively high steady value as indicated by a curve B. For comparison purposes, the current drift characteristic of the prior art device was plotted as indicated by a curve C which shows that its steady current is ten times higher than the steady value of curve A. The size of the counter plate electrode 15 was found to have little or no effect on the display performance.

Table I below shows a comparative test between the device having the 4.5 mm×5.6 mm dielectric layer according to the invention and the prior art device.

TABLE I

|  | Prior Art | Invention |
| --- | --- | --- |
| Power Consumption (microwatts/cm$^2$) | 50 | 5 |
| Life-Time Repetition Cycles | Apr. $5 \times 10^5$ | $2 \times 10^6$ or greater |
| Response (ms) | 500 | 500 |
| Holding Time | 2 min. | 10 min. or greater |

The holding time characteristic was determined by measuring the light intensity at a wavelength of 550 nanometers over the period of time from the removal of the 1.3-volt d.c. potential to the time at which the light intensity decreased below a 5% level.

EXAMPLE II

In this example, the dielectric layer 20 is formed by exposing a part of the glass substrate 10a to the electrochromic layer by etching the overlying counter plate electrode 15 (FIG. 3) so that the exposed area has a shape analogous to the shape of the display electrode 12. Three samples were constructed on different sizes of exposed dielectric areas corresponding to the sizes of dielectric layers of Example I. It was confirmed that the devices having the exposed dielectric areas have the same operating characteristics as in Example I.

It was ascertained that the dielectric layer 20 as taught by the present invention could also be used as well in electrochromic devices in which the electrochromic substance is formed by a pair of opposed members of a solid material such as oxidized tungsten or oxidized molybdenum between which a layer of electrolyte is interposed to provide positive ions such as $H^+$, $Li^+$ and $Na^+$.

What is claimed is:
1. An electrochromic display device comprising,
   a pair of first and second, opposed insulative substrates,
   a layer of an electrochromic substance sandwiched between said substrates,
   a transparent display electrode on said first substrate, and
   a counter electrode on said second substrate, said counter electrode including a dielectric region having an area substantially equal to the area of said display electrode in opposed relationship with said display electrode and a conductive region surrounding said dielectric region.
2. An electrochromic display device as claimed in claim 1, wherein said dielectric region is composed of a member selected from the group consisting of inorganic oxides, fluorides and nitrides.
3. An electrochromic display device as claimed in claim 1, wherein said dielectric region is composed of glass.
4. An electrochromic display device as clained in claim 1, wherein said dielectric region is analogous in shape to the shape of said display electrode.
5. An electrochromic display device as claimed in claim 1, wherein said dielectric region is identical in size and pattern to said display electrode.
6. An electrochromic display device as claimed in claim 1, wherein said conductive region is formed by a conductive layer on said second substrate and said dielectric region is formed by a dielectric layer on said conductive layer.
7. An electrochromic display device as claimed in claim 1, wherein said second substrate includes a dielectric member and said dielectric region is formed by a part of said dielectric member.

* * * * *